United States Patent
Lee

(10) Patent No.: US 6,615,025 B1
(45) Date of Patent: Sep. 2, 2003

(54) DUAL-MODE COMMUNICATION SYSTEM AND VOICE SIGNAL PROCESSING METHOD OF THE SAME

(75) Inventor: Sang-Min Lee, Stanford, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/454,726

(22) Filed: Dec. 4, 1999

(30) Foreign Application Priority Data

Dec. 7, 1998 (KR) .......................................... 98-53412

(51) Int. Cl.$^7$ ................................................. H04Q 7/20
(52) U.S. Cl. ......................... 455/72; 455/553; 704/500
(58) Field of Search ............................ 455/68, 70, 72, 455/403, 550, 552, 553, 3.06, 230, 232.1, 240, 240.01, 245.1, 136, 138, 219; 704/200, 500, 503; 381/106

(56) References Cited

U.S. PATENT DOCUMENTS

| | | | | |
|---|---|---|---|---|
| 4,457,014 A | * | 6/1984 | Bloy | 381/98 |
| 4,771,464 A | * | 9/1988 | Kadin et al. | 381/13 |
| 4,797,931 A | * | 1/1989 | Furukawa et al. | 324/76.29 |
| 5,329,243 A | * | 7/1994 | Tay | 330/136 |
| 5,491,839 A | * | 2/1996 | Schotz | 381/79 |
| 5,771,296 A | * | 6/1998 | Unemura | 381/28 |
| 5,790,957 A | * | 8/1998 | Heidari | 455/412 |
| 6,006,108 A | * | 12/1999 | Black et al. | 455/553 |
| 6,392,476 B1 | * | 5/2002 | Rodriguez | 330/10 |

* cited by examiner

*Primary Examiner*—William Trost
*Assistant Examiner*—Congvan Tran
(74) *Attorney, Agent, or Firm*—F. Chau & Associates, LLP

(57) ABSTRACT

A dual-mode communication system comprises a compressor for compressing a voice signal in response to a predetermined communication mode and an expander for expanding the compressed voice signal. The compressor includes a divider for dividing the voice signal by a first gain, a rectifier for rectifying the divided signal, and a gain controller for updating the first gain in response to the rectified signal. The expander includes a rectifier for rectifying the compressed voice signal, a gain controller for updating a second gain in response to the rectified signal, and a multiplier for multiplying the compressed voice signal by the second gain. The compressor and the expander may be constructed in a digital signal processor (DSP). The DSP may perform the dual mode of analog communication as well as digital communication. The dual-mode communication system needs no additional circuitry for performing the analog communication.

19 Claims, 3 Drawing Sheets

DUAL-MODE COMMUNICATION SYSTEM AND VOICE SIGNAL PROCESSING METHOD OF THE SAME

FIELD OF THE INVENTION

The present invention relates to a portable communication device such as a cellular phone, and more particularly to a dual-mode communication system having a simplified circuit construction for performing digital and analog communication.

BACKGROUND OF THE INVENTION

With the ever increasing popularity of cellular telephony, it has become necessary to provide more channels in the allocated cellular frequencies. Up until recently, existing cellular telephone systems have been comprised exclusively of "analog voice" systems. In this type of system, an analog voice signal is used to modulate a radio frequency (RF) carrier or intermediate frequency (IF) signal. Recently, "digital voice" systems have been developed in which analog communication signals are processed using digital signal processing techniques. In this type of system, the analog voice signal is first digitized and is then used to modulate either an RF carrier or an IF signal. The analog voice systems are designed for performing a frequency modulation (FM) mode of an advanced mobile phone service (AMPS), and the digital voice systems are designed for performing a time division multiple access (TDMA) mode and a code division multiple access (CDMA) mode.

More recently, the cellular telephone industry is developing "dual-mode" systems. A typical type of the dual-mode system is designed for operation in both a digital communication mode (for example, CDMA mode) and in an analog communication mode (for example, AMPS mode).

In the digital communication mode, a cellular phone converts an analog voice signal received from a microphone into a digital signal by sampling the voice signal. The digital signal is transmitted to a digital signal processor including an encoder and a decoder. The digital signal processor encodes the digital signal in response to the digital communication mode, either the TDMA mode or the CDMA mode. The encoded digital signal is re-converted into an analog signal. The analog signal is modulated in a radio frequency (RF) receiver/transmitter with carrier. In addition, a voice signal transmitted from a base station is a compressed voice signal. The voice signal is demodulated and decoded. The decoded voice signal is decompressed and recovered into a sampled analog voice signal, which is transmitted into a speaker.

In the analog communication mode, the cellular phone converts an analog voice signal from the microphone into a digital signal, and compresses the digital signal using a compressor before its transmission. In addition, a signal transmitted from the base station is recovered through an expander. The recovered signal is converted into the analog signal and outputted through the speaker.

The compressor and the expander are used for removing channel noise. For example, if the noise contained in the voice signal passes through a channel after leveling up the noise via the compressor, the major channel noise become lower than that of the voice signal. If the signal is received and passed through the expander, the noise level of the signal becomes low to the original channel noise level. In that case, the channel noise contained to the signal is lower than the noise level, so that the noise is removed.

In the most straightforward proposed implementations of CDMA/AMPS and other dual-mode systems, separate circuitry is employed for processing digitized speech information during each mode of operation. Thus, the conventional dual-mode cellular phone systems require a higher cost and a larger area for the extra circuits required to perform each mode of operations relative to single mode systems. To solve the above problems, a novel dual-communication system employing a simplified circuitry for performing both the digital communication and the analog communication, is desired.

For constructing a dual-mode communication system, a design of a compandor including the compressor and the expander is very important. Examples of compandors can be found in U.S. Pat. No. 3,919,654 to Rouben Toumani, issued on Nov. 11, 1975, "SYLLABIC COMPANDOR"; and U.S. Pat. No. 4,355,304 to Kasuga et al., issued on Oct. 19, 1982, "DIGITAL COMPANDOR". In addition, a theory of operation of a syllabic compandor is set forth in "Theory of syllabic compandors", by R. O. Carter, March, 1964 PROC. IEEE, Vol. III, No. 3, pp. 503–513.

Further, standards of a compandor are determined by a level change ratio, an attack time and a recovery time. The attack time and the recovery time are illustrated in detail on Telecommunication Industry Association(TIA)/Electronic Industry Association(EIA)/International Standard(IS)-98 as an AMPS specification. Although level change ratios of a compressor and an expander are equal, received voice signal is distorted when the attack time and the recovery time are different. Thus, a need exists for a novel compandor which can readily control the attack time and the recovery time.

SUMMARY OF THE INVENTION

It is therefore an object of the present invention to provide a dual-mode communication system having a digital signal processor for performing an analog communication as well as a digital communication.

It is another object of the invention to provide a signal processing method of the dual-mode communication system for readily controlling an attack time and a recovery time of the system.

It is still another object of the invention to provide a dual-mode communication system having a simplified circuit construction.

According to an aspect of the present invention, there is provided a communication system including a compressor for compressing a voice signal in response to a predetermined communication mode and an expander for expanding the compressed voice signal. The compressor includes a divider for dividing the voice signal by a first gain, a first full-wave rectifier for rectifying the divided signal from the divider, and a first gain controller for updating the first gain in response to the rectified signal so as to generate a compressed voice signal. The expander includes a second full-wave rectifier for rectifying the compressed voice signal, a second gain controller for updating a second gain in response to the rectified signal, and a multiplier for multiplying the compressed voice signal and the updated second gain so as to expand the compressed voice signal.

The compressor may further include a first filter coupled between the first full-wave rectifier and the first gain controller, for smoothing the rectified signal from the first full-wave rectifier. The first filter may be a digital infinite impulse response (IIR) filter which can control an attack time and a recovery time of the compressor in response to a time constant of the first filter. The expander may further include a second filter coupled between the second full-wave rectifier and the second gain controller, for smoothing the rectified signal from the second full-wave rectifier. The second filter may be a digital IIR filter which can control an attack time and a recovery time of the expander in response to a time constant of the second filter. The voice signal may be transmitted and received in an analog communication mode, for example, an advanced mobile phone service (AMPS) mode. The compressor and the expander may be included in a digital signal processor which compresses and expands a voice signal transmitted and received in a digital communication mode, for example, a code division multiple access (CDMA) mode. The communication system may also include a signal processor for converting a digital signal from the compressor into an analog signal, a transmitter for transmitting the analog signal from the signal processor with a carrier to a base station, and a receiver for receiving a compressed analog signal from the base station, wherein the signal processor converts the compressed analog signal from the receiver into a digital signal, for providing the digital signal to the expander.

According to another aspect of this invention, there is provided a method for processing a voice signal from/to a communication system including the steps of dividing the voice signal by a first gain, calculating a first magnitude value of the divided signal, and updating the first gain in response to the calculated first magnitude value, so as to compress the voice signal. The method further includes the steps of calculating a second magnitude value of a compressed voice signal, updating a second gain in response to the second magnitude value, and multiplying the compressed voice signal and the updated second gain, so as to expand the compressed voice signal. The step of calculating a first magnitude value may include performing a full-wave rectification of the divided voice signal. The step of calculating a second magnitude value may also include performing a full-wave rectification of the compressed voice signal.

The method of present invention may also include the steps of performing a resistor-capacitor (RC) filtration of the calculated first magnitude value, and performing a RC filtration of the calculated second magnitude value. The divided voice signal in the step of dividing may be directly proportional to an about square root of the voice signal before the step of dividing. The compressed voice signal multiplied in the step of multiplying may be directly proportional to an about square of the compressed voice signal in the step of calculating a second magnitude value.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF PREFERRED EMBODIMENTS

Figure 1:
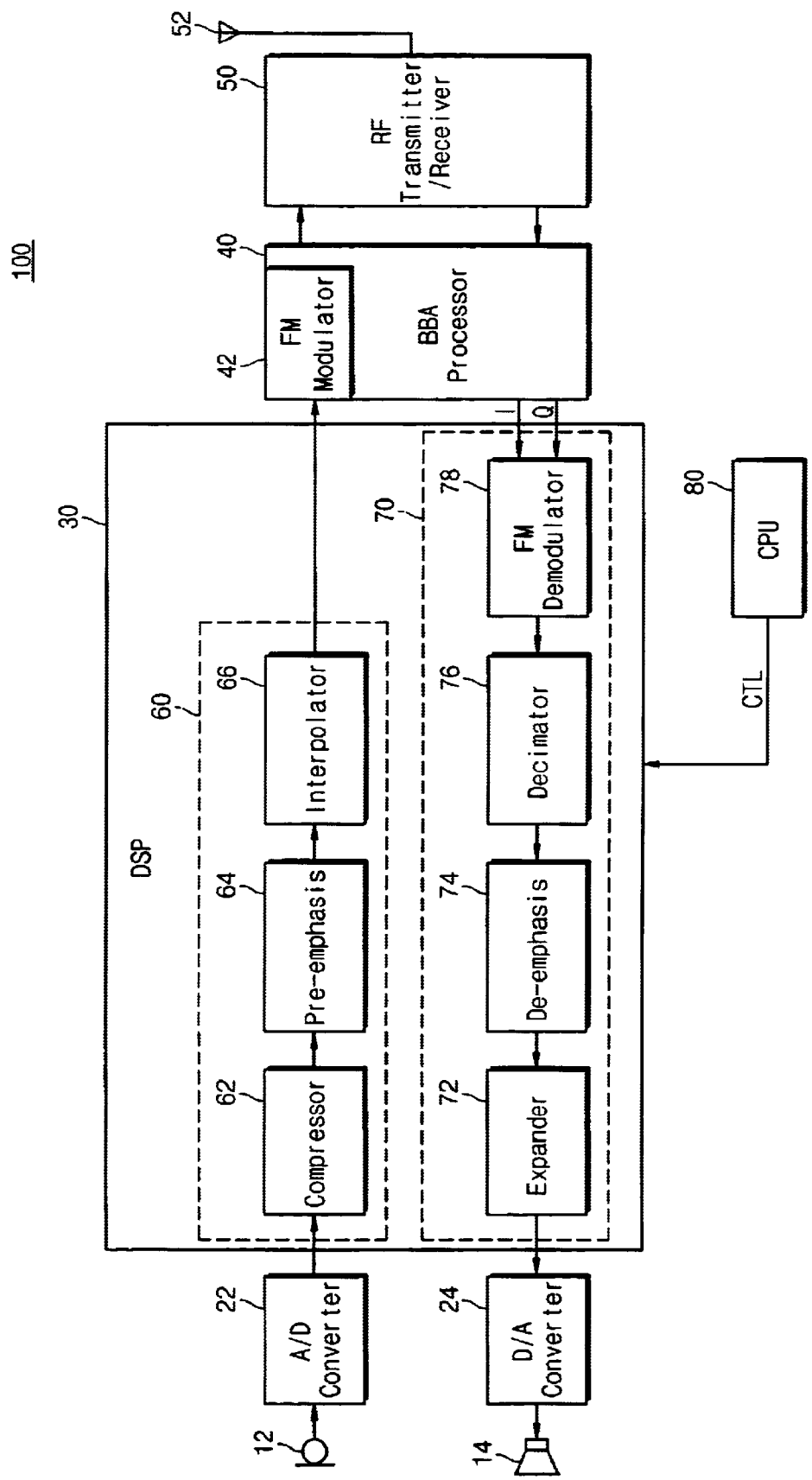
FIG. 1 is a block diagram for illustrating an internal circuitry of a dual-mode communication system according to a preferred embodiment of the present invention.

FIG. 1 is a block diagram for illustrating an internal circuitry of a dual-mode communication system 100 according to a preferred embodiment of the present invention. The dual-mode communication system 100 may be used for cellular phones. Referring to FIG. 1, the dual-mode communication system 100 comprises a microphone 12 for receiving a voice signal, and a speaker 14 for outputting the received voice signal. In addition, the dual-mode communication system 100 comprises an analog-digital (A/D) converter 22, a digital-analog (D/A) converter 24, a digital signal processor (DSP) 30 controlled by a central processing unit (CPU) 80, a baseband analog (BBA) processor 40, and a radio frequency (RF) transmitter/receiver 50. The dual-mode communication system 100 is constructed so as to communicate in an analog communication mode and a digital communication mode.

The A/D converter 22 converts an analog voice signal from the microphone 12 into a digital signal by sampling the voice signal. The D/A converter 24 converts a digital signal from the DSP 30 into an analog signal, and provides the converted analog signal for the speaker 14.

The DSP 30 includes an encoder 60 and a decoder 70. The encoder 60 includes a compressor 62, a pre-emphasis 64, and an interpolator 66. The decoder 70 includes an expander 72, a de-emphasis 74, a decimator 76, and a FM demodulator 78. The DSP 30 is controlled by control signals CTL from the CPU 80, so as to operate in the analog 14 communication mode as well as the digital communication mode.

The digital signal converted by the A/D converter 22 is compressed in the compressor 62. The compressed signal is provided for a FM modulator 42 through the pre-emphasis 64 and the interpolator 66. The FM modulator 42 is used for modulating the output signal from the encoder 60 in the analog communication mode. The modulation is performed digitally. A digitized output signal from the FM modulator 42 is converted to an analog signal by the BBA processor 40 and transmitted to the RF transmitter/receiver 50. The RF transmitter/receiver 50 transmits the analog signal with a carrier to a base station through an antenna 52.

A voice signal transmitted from, for example, other cellular phone is received by the RF transmitter/receiver 50 through the antenna 52. The voice signal is a compressed voice signal. The RF transmitter/receiver 50 separates carrier from the received voice signal, and outputs an intermediate frequency (IF) signal. The IF signal is converted into a digital signal in the BBA processor 40. The converted digital signal is provided for the decoder 70. The signal is demodulated in the FM demodulator 78 of the decoder 70, and provided for the expander 72 through the decimator 76 and the de-emphasis 74. The expander 72 expands the digital signal from the de-emphasis 74 into the original signal level, and outputs the expanded signal to the D/A converter 24. The D/A converter 24 converts the expanded signal into an analog signal, and outputs the analog signal into the speaker 14. Thus, the DSP 30 processes the voice signal for the analog communication mode(for example, AMPS mode) as well as the voice signal for the digital communication mode(for example, CDMA mode).

Figure 2:
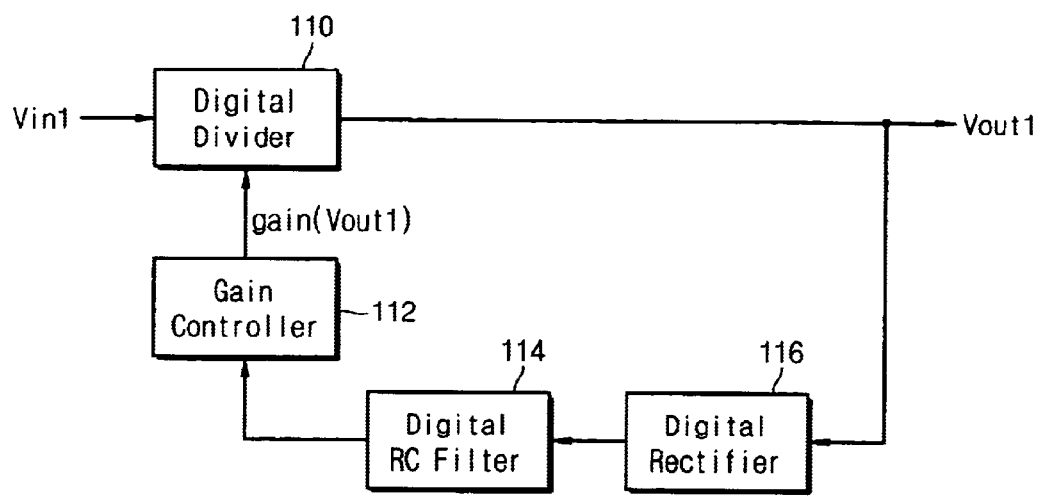
FIG. 2 is a detailed block diagram for illustrating the compressor shown in FIG. 1.
Figure 3:
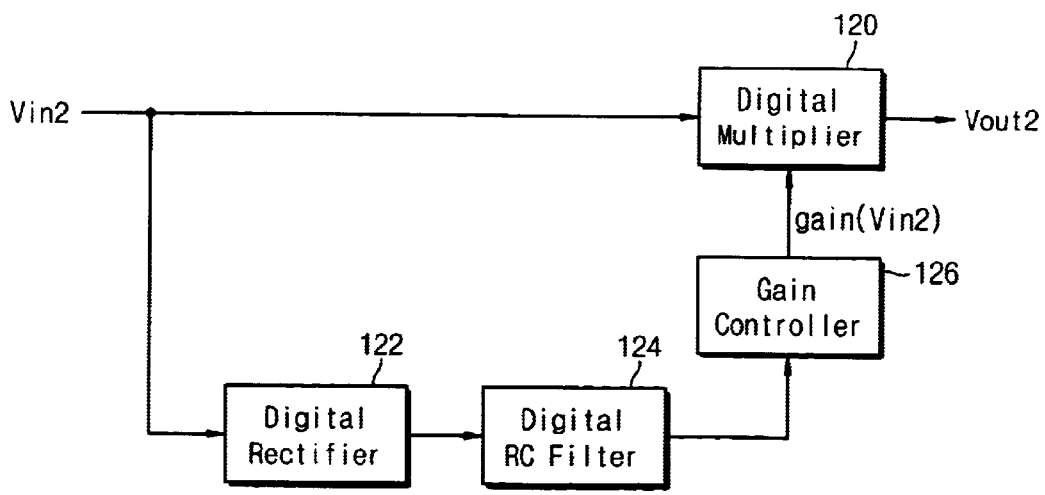
FIG. 3 is a detailed block diagram for illustrating the expander shown in FIG. 1.

Referring to FIGS. 2 and 3, preferred embodiments of the compressor 62 and the expander 72 according to the present invention are illustrated in detail. Generally, an analog compressor obtains an output signal by amplifying an input signal as much as a gain being inversely proportional to the output signal. However, the digital compressor 62 according to the present invention obtains an output signal Vout1 by dividing an input signal Vin1 by a gain gain(Vout1) being directly proportional to the output signal Vout1. The gain is obtained by full-wave rectification of the output signal Vout1 and resistor-capacitor (RC) filtration of the rectified signal. An analog RC filter composed of a resistor and a capacitor has a transfer function as described in equation (1).

$$H(s) = \frac{1}{1 + RCs} \quad (1)$$

In the equation (1), R is a resistance, C is a capacitance, and RC is a time constant of the filter. As described above, the compressor 62 obtains the output signal Vout1 by dividing the input signal Vin1 by the gain gain(Vout1) which is in direct proportion to the output signal Vout1 as illustrated in equation (2).

$$\frac{Vin1}{gain(Vout1)} = Vout1 \quad (2)$$

In equation (2), the gain gain(Vout1) is in direct proportion to the output signal Vout1, so that the output signal Vout1 is in direct proportion to a square root of the input signal Vin1 as illustrated in equation (3).

$$Vout1 = \alpha\sqrt{Vin1} \quad (3)$$

Where, $\alpha$ is a proportional constant. For example, in the equation (3), when the input signal Vin1 is changed by 2 dB, the output signal Vout1 is changed by 1 dB.

An attack time and a recovery time of the compressor 62 is determined by the time constant RC which is used for obtaining the gain. For example, when the time constant RC is 20 msec, the attack time is 3 msec and the recovery time is 13.5 msec, in the AMPS specification.

Figure 4:
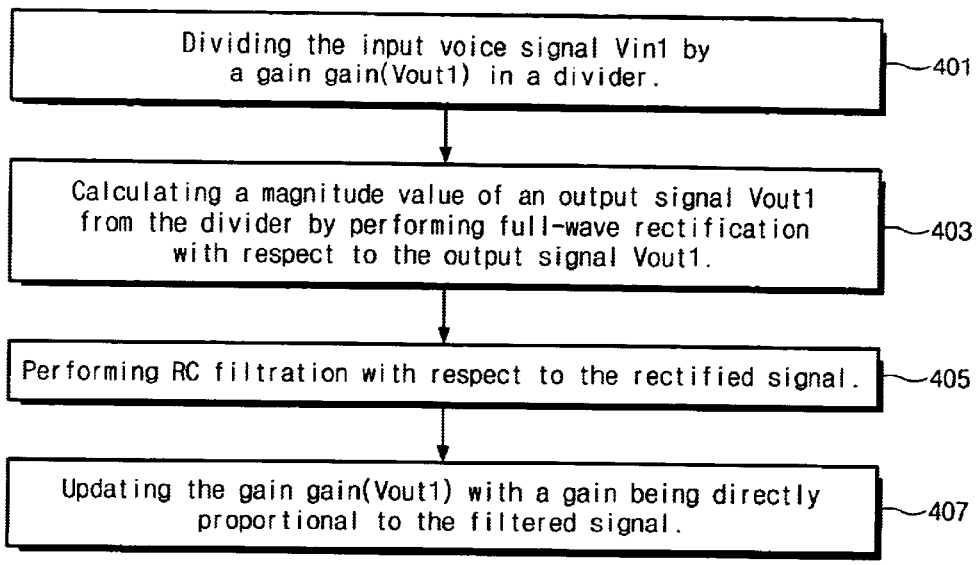
FIG. 4 shows a series of steps for illustrating operations of the compressor in FIG. 2.

FIG. 2 is a detailed block diagram for illustrating the compressor 62 shown in FIG. 1, and FIG. 4 shows a series of steps for illustrating operations of the compressor 62. Referring to FIGS. 2 and 4, the compressor 62 includes a digital divider 110, a gain controller 112, a digital RC filter 114, and a digital rectifier 116. The digital divider 110 divides the input signal Vin1 from the A/D converter 22 by a predetermined gain gain(Vout1) (step 401). The digital rectifier 116 fully rectifies the output signal Vout1 from the digital divider 110. In that case, if the output signal Vout1 is greater than zero, the rectified signal is outputted without being inverted, and if the output signal Vout1 is less than zero, the rectified signal is outputted after being inverted, so that a magnitude value of the output signal Vout1 from the digital divider 110 is calculated through the rectifier 116 (step 403). The rectified signal from the rectifier 116 is smoothed through the digital RC filter 114 (step 405). The filtered signal from the digital RC filter 114 is provided for the gain controller 112. The gain controller 112 outputs the gain gain(Vout1) being in direct proportion to the filtered signal from the digital RC filter 114 (step 407). For realizing the digital RC filter 114, a bilinear transform is used as shown in equation (4).

$$s = \frac{2}{T}\frac{(1 - Z^{-1})}{(1 + Z^{-1})}$$

If the equation (4) is substituted for "s" of the equation (1), equation (5) is obtained as follows.

$$H(z) = \frac{1}{RC\frac{2}{T} + 1} \frac{(1 + Z^{-1})}{1 - \frac{RC\frac{2}{T} - 1}{RC\frac{2}{T} + 1}Z^{-1}} \quad (5)$$

Equation (5) is a transfer function of the digital RC filter 114. The digital RC filter 114 may be an infinite impulse response (IIR) filter. In that case, the attack time and the recovery time can be adjusted by controlling the time constant RC. Thus, the compressor 62 having a desirable attack time and a desirable recovery time can be realized by using the digital RC filter 114 having the transfer function shown in equation (5).

For example, when a sampling rate is 8 KHz and the time constant RC is 20 msec as the AMPS specification, the transfer function of the digital RC filter 114 of the compressor 62 is illustrated as follows.

$$H(z) = \frac{1}{16 \times 20 + 1} \frac{(1 + Z^{-1})}{1 - \frac{16 \times 20 - 1}{16 \times 20 + 1}Z^{-1}} \quad (6)$$

As described above, the compressor 62 compresses the voice signal inputted from the microphone 12, by dividing the input signal Vin1 by the gain gain(Vout) being in direct proportion to the output signal Vout1. The gain is obtained by full-wave rectifying the output signal Vout1 through the digital rectifier 116, and smoothing the rectified signal through the digital RC filter 114.

Generally, an analog expander obtains an output signal by amplifying an input signal as much as a gain being in direct proportion to the input signal. However, the digital expander 72 according to the present invention obtains an output signal Vout2 by multiplying an input signal Vin2 by a gain gain(Vin2) being in direct proportion to the input signal Vin2. The gain gain(Vin2) is obtained by full-wave rectification of the input signal Vin2 and RC filtration of the rectified signal. This relationship is illustrated as follows.

$$Vin2 \times gain(Vin2) = Vout2 \quad (7)$$

In equation (7), the output signal Vout2 is amplified as much as the gain gain(Vin2) which in direct proportion to the input signal Vin2. Thus, the output signal Vout2 is in direct proportion to a square of the input signal Vin2 as shown in equation (8).

$$Vout2 = \beta(Vin2) \quad (8)$$

Where, $\beta$ is a proportional constant. Referring to equation (8), when the input signal Vin2 is changed by 1 dB, the output signal Vout2 is changed by 2 dB. An attack time and a recovery time of the expander 72 is determined by a time constant RC which is used for obtaining the gain gain(Vin2).

For example, in the AMPS specification, when the time constant RC is 20 msec, the attack time is 3 msec and the recovery time is 13.5 msec, respectively.

Figure 5:
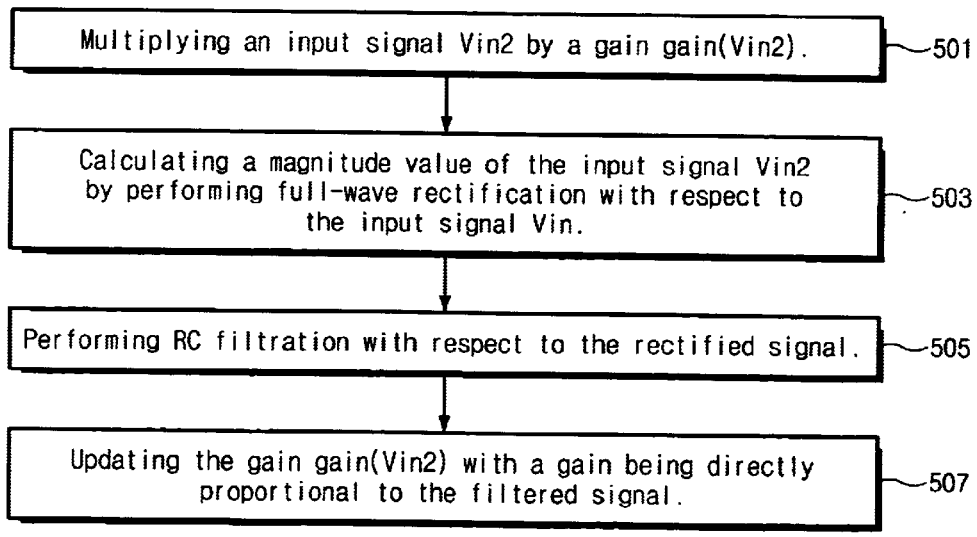
FIG. 5 shows a series of steps for illustrating operations of the expander in FIG. 3.

FIG. 3 is a detailed block diagram for illustrating the expander 72 shown in FIG. 1, and FIG. 5 shows a series of steps for illustrating operations of the expander 72. Referring to FIG. 3, the expander 72 includes a digital multiplier 120, a digital rectifier 122, a digital RC filter 124, and a gain controller 126. The digital multiplier 120 outputs the output signal Vout2 by multiplying the input signal Vin2 and a predetermined gain gain(Vin2) (step 501). At this time, the digital rectifier 122 fully rectifies the input signal Vin2. In that case, if the input signal Vin2 is greater than zero, the digital rectifier 122 outputs a rectified signal without inverting, and if the input signal Vin2 is less than zero, the digital rectifier 122 outputs the rectified signal after inverting. Therefore, a magnitude value of the input signal Vin2 is obtained (step 503). The rectified signal from the digital rectifier 122 is smoothed in the digital RC filter 124 (step 505), and is provided for the gain controller 126. The gain controller 126 outputs the gain gain(Vin2) being in direct proportion to the filtered signal from the RC filter 124 (step 507). The digital RC filter 124 is an IIR filter having the same structure of the digital filter 114 of the compressor 62. In addition, the digital RC filter 124 operates as the digital RC filter 114 of the compressor 62.

For example, to realize a digital compressor and an expander, a method for constructing a cascade RC filter has been used. In that case, both the attack time and the recovery time are set into "0", and a root square of the input signal Vin1 (in case of a compressor) or a square of the input signal Vin2 (in case of an expander) is calculated, firstly. However, the method has a problem that a phase of the original input signal is defected extremely owing to IIR filter characteristics.

Compared with the above method, the digital compressor 62 and the expander 72 according to the present invention apply the IIR filters 114 and 124 to the original input signal, so as to maintain the phase of the input signal. The digital compressor 62 and the expander 72 are realized to obtain the output signals by multiplying or dividing the input signals by the gain in which the adjusted attack time and recovery time are reflected. At this time, the attack time and the recovery time can be adjusted easily by controlling the time constant RC of the digital IIR filters 114 and 124.

In the preferred embodiments of the present invention, the compressor 62 and the expander 72 are constructed digitally in the DSP 30 for performing digital signal processing, so that no additional analog device is required. Therefore, the dual-mode communication system according to the present invention has a simplified circuit construction. In addition, during one sampling time (for example, during 1/8000 sec when a sampling rate is 8 KHz), the compressor 62 calculates less than fifty instructions (magnitude value : 2, IIR filter: 20, divider: 20), and the expander 72 calculates less than forty instructions (magnitude value : 2, IIR filter: 20, multiplier: 1). Since the DSP can process, for example, 40 million instructions per second (MIPS), the digital compressor 62 and the expander 72 of the present invention can be realized by using a small portion of a calculating capacity of the DSP 30.

While the invention has been described in terms of exemplary embodiments, it is contemplated that it may be practiced as outlined above with modifications within the spirit and scope of the appended claims.

What is claimed is:

1. A communication system comprising:

a compressor for compressing a voice signal in response to a predetermined communication mode, the compressor including a divider for dividing the voice signal by a first gain, a first full-wave rectifier for rectifying the divided signal from the divider, and a first gain controller for updating the first gain in response to a square root of the voice signal, whereby the compressor generates a compressed voice signal; and an expander for expanding the compressed voice signal, the expander including a second full-wave rectifier for rectifying the compressed voice signal, a second gain controller for updating a second gain in response to the rectified signal, and a multiplier for multiplying the compressed voice signal and the updated second gain, whereby the expander expands the compressed voice signal.

2. The communication system of claim 1, wherein the compressor further comprises a first filter coupled between the first full-wave rectifier and the first gain controller, the first filter for smoothing the rectified signal from the first full-wave rectifier.

3. The communication system of claim 2, wherein the first filter is a digital infinite impulse response (IIR) filter, the IIR filter for controlling an attack time and a recovery time of the compressor in response to a time constant of the first filter.

4. The communication system of claim 1, wherein the expander further comprises a second filter coupled between the second full-wave rectifier and the second gain controller, the second filter for smoothing the rectified signal from the second full-wave rectifier.

5. The communication system of claim 4, wherein the second filter is a digital IIR filter, the IIR filter for controlling an attack time and a recovery time of the expander in response to a time constant of the second filter.

6. The communication system of claim 1, wherein the voice signal is transmitted and received in an analog communication mode.

7. The communication system of claim 6, wherein the analog communication mode is an advanced mobile phone service (AMPS) mode.

8. The communication system of claim 1, wherein the compressor and the expander are included in a digital signal processor.

9. The communication system of claim 8, wherein the digital signal processor compresses and expands a voice signal transmitted and received in a digital communication mode.

10. The communication system of claim 9, wherein the digital communication mode is a code division multiple access (CDMA) mode.

11. The communication system of claim 1, further comprising:

a signal processor for converting a digital signal from the compressor into an analog signal;

a transmitter for transmitting the analog signal from the signal processor with a carrier to a base station; and a receiver for receiving a compressed analog signal from the base station, wherein the signal processor converts the compressed analog signal from the receiver into a digital signal, for providing the converted digital signal to the expander.

12. The communication system of claim 1, wherein the first gain is directly proportional to the divided signal output from the divider, and the second gain is directly proportional to the compressed voice signal input to the expander.

13. A method for processing voice signal from/to a communication system, comprising the steps of:

compressing the voice signal by:
        dividing the voice signal by a first gain;
        rectifying the divided signal;
        updating the first gain in response to the rectified signal; and
    expanding the compressed voice signal by:
        rectifying the compressed voice signal;
        updating a second gain in response to the rectified signal; and
        multiplying the compressed voice signal and the updated second gain to expand the compressed voice signal.

14. The method of claim 13, wherein the voice signal is transmitted and received in an analog communication mode.

15. The method of claim 13, wherein the voice signal is compressed and expanded in a digital signal processor.

16. The method of claim 15, wherein the digital signal processor compresses and expands a voice signal transmitted and received in a digital communication mode.

17. The method of claim 13, wherein the step of rectifying the divided voice signal is by full wave rectification and the step of rectifying the compressed voice signal is by full wave rectification.

18. The method of claim 13, further including the steps of:

performing a resistor-capacitor (RC) filtration of the rectified signal of the divided signal; and performing a RC filtration of the rectified signal of the compressed voice signal.

19. The method of claim 13, wherein the divided voice signal in the step of dividing is directly proportional to an about square root of the voice signal before the step of dividing, and the compressed voice signal multiplied in the step of multiplying is directly proportional to an about square of the compressed voice signal in the step of rectifying the compressed voice signal.

\* \* \* \* \*